United States Patent
Kusumi (10) Patent No.: US 7,123,491 B1
(45) Date of Patent: Oct. 17, 2006

(54) AC-DC CONVERTING DEVICE, AND ELECTRICAL APPARATUS PROVIDED WITH AC-DC CONVERTING FUNCTION

(75) Inventor: Tadaharu Kusumi, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 11/394,041

(22) Filed: Mar. 29, 2006

(30) Foreign Application Priority Data

Mar. 30, 2005 (JP) .............................. 2005-097664

(51) Int. Cl.
H02M 1/12 (2006.01)
G05F 1/40 (2006.01)
(52) U.S. Cl. ....................................... 363/46; 323/286
(58) Field of Classification Search ................. 363/39, 363/44, 46, 125; 323/282, 286, 351
See application file for complete search history.

(56) References Cited

U.S. PATENT DOCUMENTS 5,016,157 A * 5/1991 Rozman et al. ............... 363/39
5,471,378 A * 11/1995 King ............................ 363/46
5,499,178 A * 3/1996 Mohan ......................... 363/39
6,009,004 A * 12/1999 Swamy ........................ 363/47

FOREIGN PATENT DOCUMENTS

JP          3583267          8/2004

* cited by examiner

*Primary Examiner*—Adolf Berhane
(74) *Attorney, Agent, or Firm*—Gerald E. Hespos; Anthony J. Casella (57) ABSTRACT

An AC adaptor has a switching regulator for converting alternate current to direct current. Filters are provided to filter conducted noise, and a filter switcher switches to the filter to be used in the AC adaptor. A detector detects power consumption state of an electrical apparatus. A state-filter relations storage stores correlations between the power consumption states of the apparatus and the filters to determine the filter that meets requirements so that the conducted noise to be filtered in the AC adaptor is suppressed to a standard limit value or less and so that power consumption is made lowest among the filters. A filter switching controller controls the filter switcher to switch to the filter to be used in the AC adaptor in correlation to the detected power consumption state of the electrical apparatus.

10 Claims, 7 Drawing Sheets

| POWER CONSUMPTION STATE | FILTER TYPE |
|---|---|
| LOW POWER CONSUMPTION STATE | A FILTER |
| STANDBY STATE | B FILTER |
| OPERATED STATE | C FILTER |

AC-DC CONVERTING DEVICE, AND ELECTRICAL APPARATUS PROVIDED WITH AC-DC CONVERTING FUNCTION

BACKGROUND OF THE INVENTION

1. Field of the Invention

The present invention relates to an AC-DC converting device and an electrical apparatus, and more particularly to a technology of converting an alternate current (AC) to a direct current (DC).

2. Description of the Related Art

In order to eliminate adverse effects of conducted noise propagating from an electronic device connected to a commercial power source to other electronic device or the like via an alternate current (AC) cable, various standards such as the standard proposed by the CISPR (International Special Committee on Radio Interference) are provided to suppress the conducted noise. Most of the conducted noise results from a switching regulator. A general approach of suppressing the conducted noise is to provide a filter constituted of a coil, a capacitor or a like element between an AC input end of a power source, and a switching regulator. Conducted noise greatly fluctuates depending on an operation state of the electronic device. Normally, a filter which meets the requirements on standard limit value defined by the standard in all the possible operation states of the electronic device is used so that the conducted noise may not exceed the standard limit value in all the possible operation states of the electronic device.

Japanese Patent No. 3583267 recites an image forming apparatus that enables to optimally control the number of voltage fluctuations resulting from an in-rush current into a heater in various states of the image forming apparatus, and to suppress power source voltage fluctuation and higher harmonic wave to a commercial power source without additionally providing a hardware component or a filter member.

Power consumption of a filter differs depending on the filtering performance. In other words, a filter having a high filtering performance consumes a large amount of electric power. Accordingly, in use of a filter which meets the requirements on standard limit value in all the possible operation states of an electronic device, a larger amount of electric power than required may be consumed if the conducted noise is lower than the standard limit value. Also, the above publication is silent about a technique of filtering the conducted noise.

SUMMARY OF THE INVENTION

In view of the above problems residing in the prior art, it is an object of the present invention to provide an improved arrangement that enables to suppress conducted noise to a standard limit value or less in various states of an electrical apparatus, and to suppress power consumption in filtering the conducted noise.

To attain the above object, an aspect of the invention is directed to a converting device for converting an alternate current to a direct current. The converting device comprises: a converter, provided with a switching regulator, for converting an alternate current to a direct current; a plurality of filters, provided on an alternate current side of the converter, for filtering a conducted noise generated at the converter, the filters having filtering performances different from each other; a filter switcher for switching the filter to be used in the converting device among the plurality of filters; a detector for detecting one of a plurality of different power consumption states of an electrical apparatus connected to the converting device; a storage for storing correlations between the power consumption states of the electrical apparatus and the filters to determine the filter which meets requirements that the conducted noise to be filtered in the converting device is suppressed to a standard limit value or less, and power consumption is made lowest among the filters; and a filter switching controller for acquiring the power consumption state of the electrical apparatus detected by the detector, and reading out, from the storage, the filter which meets the requirements that the conducted noise to be filtered in the converting device is suppressed to the standard limit value or less and the power consumption is made lowest among the filters to control the filter switcher to switch over the filter to be used in the converting device to the readout filter.

With the above arrangement, the detector detects one of the different power consumption states of the electrical apparatus connected to the converting device. The filter switching controller reads out, from the storage, the type of the filter which meets the requirements that the conducted noise to be filtered in the detected power consumption state of the electrical apparatus is suppressed to the standard limit value or less, and the power consumption is made lowest among the filters. The filter switching controller controls the filter switcher to switch over the filter to be provided on the AC input side of the converter to the readout filter.

This arrangement enables to suppress the conducted noise to the standard limit value or less, and to reduce the power consumption in filtering the conducted noise.

These and other objects, features and advantages of the present invention will become more apparent upon reading of the following detailed description along with the accompanying drawings.

DETAILED DESCRIPTION OF THE PREFERRED EMBODIMENTS

Figure 1:
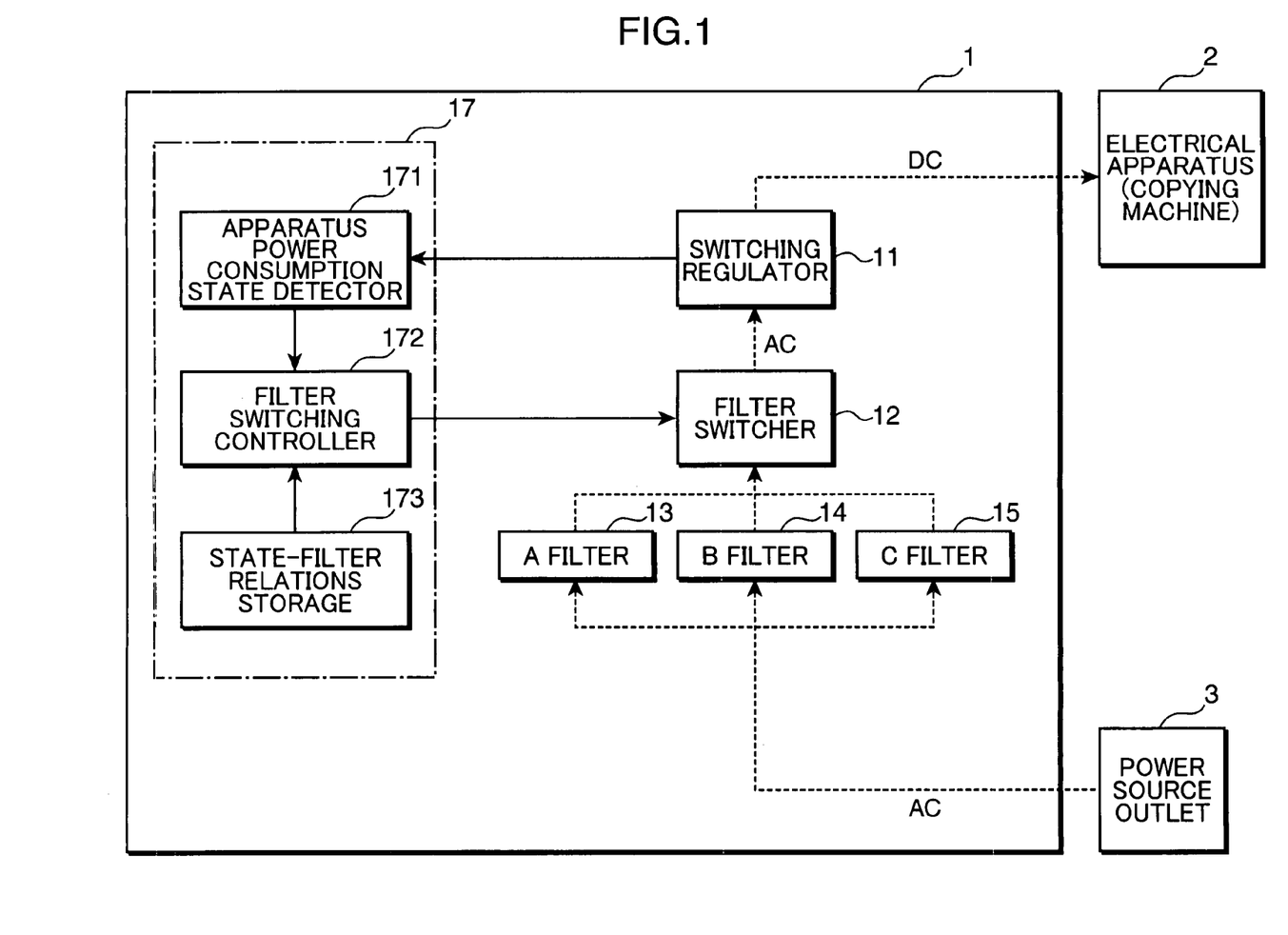
FIG. 1 is a block diagram showing a functional arrangement of an AC adaptor as an embodiment of the invention.

In the following, an embodiment of the invention is described referring to the drawings. FIG. 1 is a block diagram showing a functional arrangement of an AC adaptor 1, serving as a converting device according to an embodiment of the invention. The AC adaptor 1 is adapted to convert an alternate current (AC) as an input into a direct current (DC) for supplying the DC to an electrical apparatus 2 e.g. an image forming apparatus. The AC adaptor 1 functionally includes a switching regulator 11, a filter switcher 12, an A filter 13, a B filter 14, a C filter 15, and a control unit 17. Hereinafter, the A filter 13, the B filter 14, and the C filter 15 are simply called as filters 13, 14, and 15, respectively. The dashed line arrows in FIG. 1 indicate a flow of a current which is supplied from a power source outlet 3 to the electrical apparatus 2 by connection of the AC adaptor 1 to the electrical apparatus 2.

The switching regulator 11 is adapted to acquire a DC by switching the AC supplied from the power source outlet 3 with a high frequency e.g. several ten kilo Hertz. Conducted noise may be generated at the switching regulator 11 due to the switching operation. The conducted noise generated at the switching regulator 11 may be propagated to other device through an AC cable connected to an AC input side of the AC adaptor 1, and an electrical interference or the like may resultantly be caused.

The filters 13, 14, and 15 are filters each adapted to reduce the conducted noise generated at the switching regulator 11. The filters 13, 14, and 15 have filtering performances and power consumptions different from each other. The filters 13, 14, and 15 are each constituted of a coil and/or a capacitor.

Figure 2:
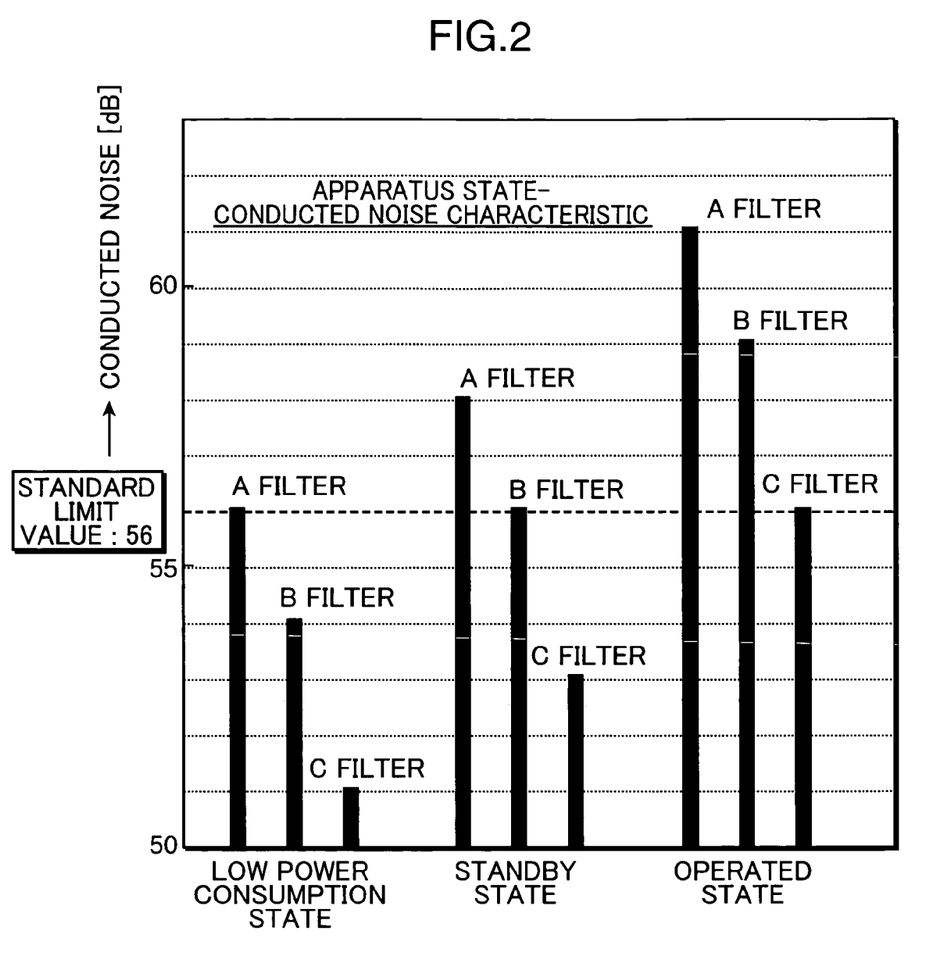
FIG. 2 is a graph showing filtering performances of filters in relation to power consumption states of an electrical apparatus in the embodiment of the invention.
Figure 3:
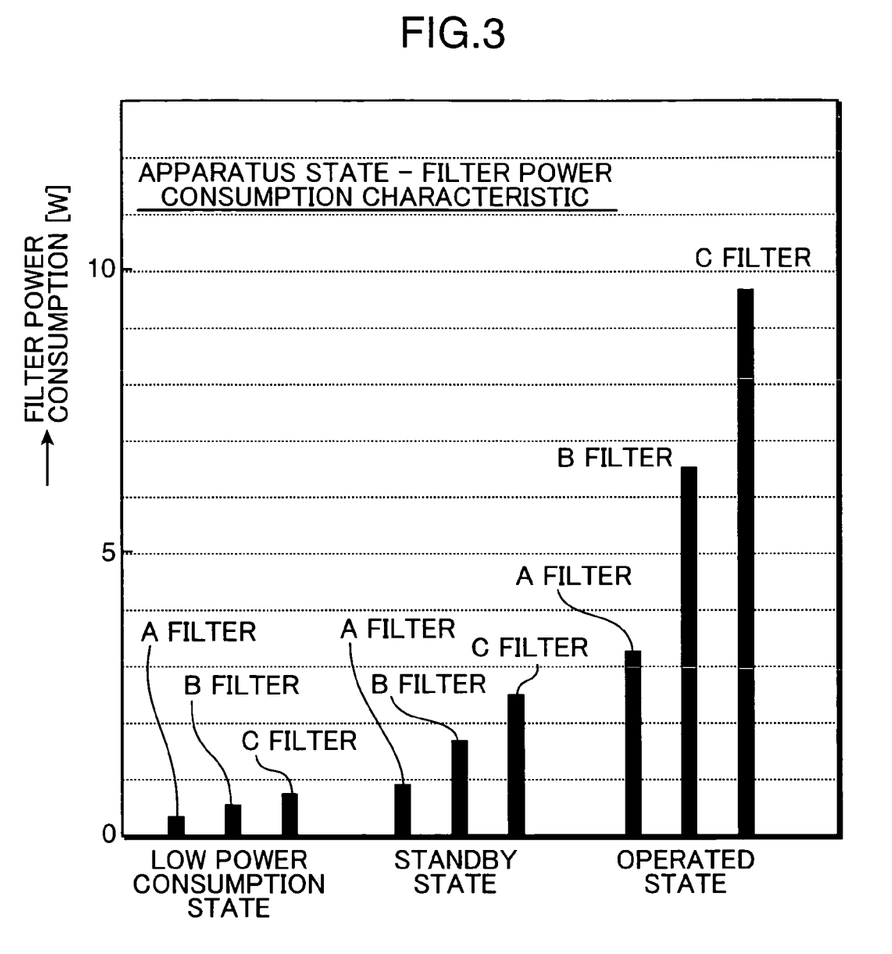
FIG. 3 is a graph showing power consumption amounts of the respective filters in relation to each of the power consumption states of the electrical apparatus in the embodiment.

Filtering characteristics of the filters 13, 14, and 15 are described referring to FIGS. 2 and 3. FIG. 2 is a graph showing the filtering performances of the respective filters 13, 14, and 15 in relation to power consumption states of the electrical apparatus 2 i.e. an image forming apparatus to which the electric power is supplied through the AC adaptor 1. When the electrical apparatus 2 is in a low power consumption state corresponding to a lowest power consumption state of the electrical apparatus 2, the filter 13 shows such a characteristic as to suppress the conducted noise to e.g. 56 dB, the filter 14 shows such a characteristic as to suppress the conducted noise to e.g. 54 dB, which is lower than the conducted noise limit of the filter 13, and the filter 15 shows such a characteristic as to suppress the conducted noise to e.g. 51 dB which is lower than the conducted noise limit of the filter 14. When the electrical apparatus 2 is in a standby state corresponding to a state whose power consumption is larger than that in the low power consumption state, and is smaller than that in an operated state of the electrical apparatus 2, the filter 13 shows such a characteristic as to suppress the conducted noise to e.g. 58 dB, the filter 14 shows such a characteristic as to suppress the conducted noise to e.g. 56 dB, which is lower than the conducted noise limit of the filter 13, and the filter 15 shows such a characteristic as to suppress the conducted noise to e.g. 53 dB which is lower than the conducted noise limit of the filter 14. When the electrical apparatus 2 is in the operated state corresponding to a highest power consumption state of the electrical apparatus 2, the filter 13 shows such a characteristic as to suppress the conducted noise to e.g. 61 dB, the filter 14 shows such a characteristic as to suppress the conducted noise to e.g. 59 dB, which is lower than the conducted noise limit of the filter 13, and the filter 15 shows such a characteristic as to suppress the conducted noise to e.g. 56 dB which is lower than the conducted noise limit of the filter 14.

FIG. 3 is a graph showing power consumption amounts of the respective filters 13, 14, and 15 in each of the power consumption states of the electrical apparatus 2 i.e. the image forming apparatus. When the electrical apparatus 2 is in the low power consumption state, the power consumption amount of the filter 13 is e.g. 0.3 W, the power consumption amount of the filter 14 is e.g. 0.6 W, which is larger than that of the filter 13, and the power consumption amount of the filter 15 is e.g. 0.8 W, which is larger than that of the filter 14. When the electrical apparatus 2 is in the standby state, the power consumption amount of the filter 13 is e.g. 0.9 W, the power consumption amount of the filter 14 is e.g. 1.7 W, which is larger than that of the filter 13, and the power consumption amount of the filter 15 is e.g. 2.5 W, which is larger than that of the filter 14. When the electrical apparatus 2 is in the operated state, the power consumption amount of the filter 13 is e.g. 3.2 W, the power consumption amount of the filter 14 is e.g. 6.5 W, which is larger than that of the filter 13, and the power consumption amount of the filter 15 is e.g. 9.7 W, which is larger than that of the filter 14.

The graphs in FIGS. 2 and 3 show that, in the case where the standard limit value of the conducted noise is 56 dB for instance, use of the filter 13 in the low power consumption state, use of the filter 14 in the standby state, and use of the filter 15 in the operated state of the electrical apparatus 2 are effective in suppressing the conducted noise to the standard limit value or less, and in minimizing the power consumption amounts of the respective filters 13, 14, and 15, as far as these filters 13, 14, and 15 are used.

Referring back to FIG. 1, the filter switcher 12 is adapted to switch over the filter through which the AC is allowed to be inputted to the switching regulator 11 among the filters 13, 14, and 15. The filter switcher 12 is constituted of e.g. a phototriac coupler. The filter switcher 12 is adapted to switch over the filter to be used in the electrical apparatus 2 among the filters 13, 14, and 15 based on a command from a filter switching controller 172.

The control unit 17 controls overall operations of the AC adaptor 1, and includes a read only memory (ROM) for storing a program, a central processing unit (CPU) for executing the program stored in the ROM, and a random access memory (RAM) serving as a work area or the like for execution of the program. The control unit 17 functionally includes an apparatus power consumption state detector 171, the filter switching controller 172, and a state-filter relations storage 173.

The apparatus power consumption state detector 171 detects a power consumption state i.e. an operation mode of the electrical apparatus 2 to which the electric power is supplied through the AC adaptor 1. The apparatus power consumption state detector 171 detects the power consumption state of the electrical apparatus 2 based on e.g. an amount of a current flowing in the switching regulator 11. Specifically, the apparatus power consumption state detector 171 judges that the electrical apparatus 2 is in the low power consumption state if the amount of the current flowing in the switching regulator 11 lies in a predetermined range, for instance, is 0.9 A or smaller; judges that the electrical apparatus 2 is in the standby state if the amount of the current flowing in the switching regulator 11 lies in a predetermined range, for instance, is larger than 0.9 A and not large than 1.6 A; and judges that the electrical apparatus 2 is in the operated state if the amount of the current flowing in the switching regulator 11 lies in a predetermined range, for instance, is larger than 1.6 A. Upon detecting a change of the power consumption state, the apparatus consumption state detector 171 sends, to the filter switching controller 172, the currently detected power consumption state, i.e. one of the low power consumption state, the standby state, and the operated state of the electrical apparatus 2.

Figure 4:
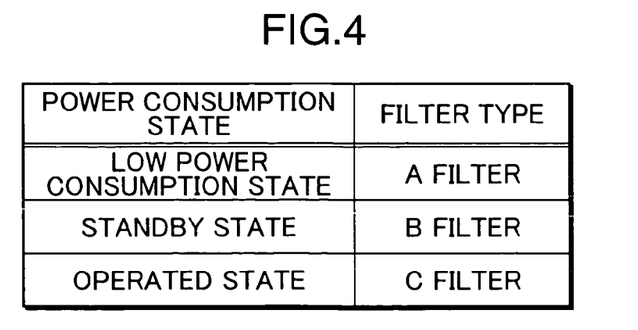
FIG. 4 is an illustration of an exemplified look up table showing correlations between the power consumption states of the electrical apparatus and the filters in the embodiment.

The state-filter relations storage 173 stores information relating to correlations between the power consumption states i.e. the operation modes of the electrical apparatus 2 to which the electrical power is supplied through the AC adaptor 1, and the filters 13, 14, and 15, wherein the correlations satisfy the requirements that the conducted noise in the detected power consumption state of the electrical apparatus can be suppressed to the standard limit value or less, and the power consumption is lowest among the filters 13, 14, and 15. The state-filter relations storage 173 is constituted of an ROM for instance. FIG. 4 shows an example of the information, which is a lookup table, to be stored in the state-filter relations storage 173. The lookup table indicates that: the filter 13 is associated with the low power consumption state; the filter 14 is associated with the standby state; and the filter 15 is associated with the operated state. This is because, as far as these three filters 13, 14, and 15 are used, the use of the filter 13 in the low power consumption state, the use of the filter 14 in the standby state, and the use of the filter 15 in the operated state of the electrical apparatus 2 is advantageous in minimizing the power consumption amounts of the respective filters 13, 14, and 15, while securely suppressing the conducted noise to the standard limit value or less, based on the graphical presentations shown in FIGS. 2 and 3 where the standard limit value of the conducted noise is set to 56 dB for instance.

Upon receiving information concerning the currently detected power consumption state of the electrical apparatus 2 from the apparatus power consumption state detector 171, the filter switching controller 172 reads out, from the state-filter relations storage 173, the type of the filter which has been stored in relation to the detected power consumption state of the electrical apparatus, and controls the filter switcher 12 to switch over the filter to be used in the electrical apparatus 2 to the readout filter.

Figure 5:
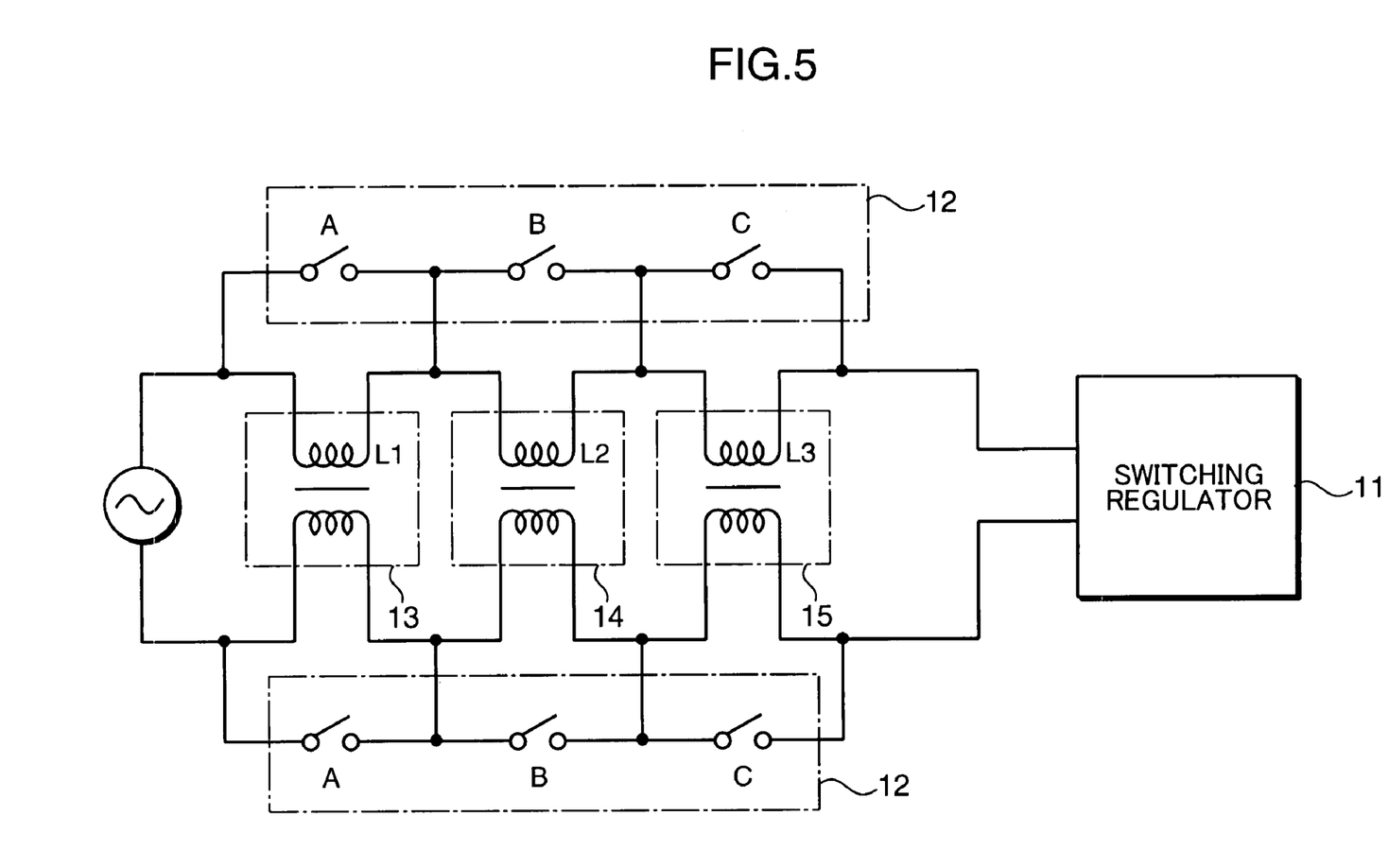
FIG. 5 is a circuit diagram showing an example on an arrangement of the filters and a filter switcher in the embodiment.
Figure 6:
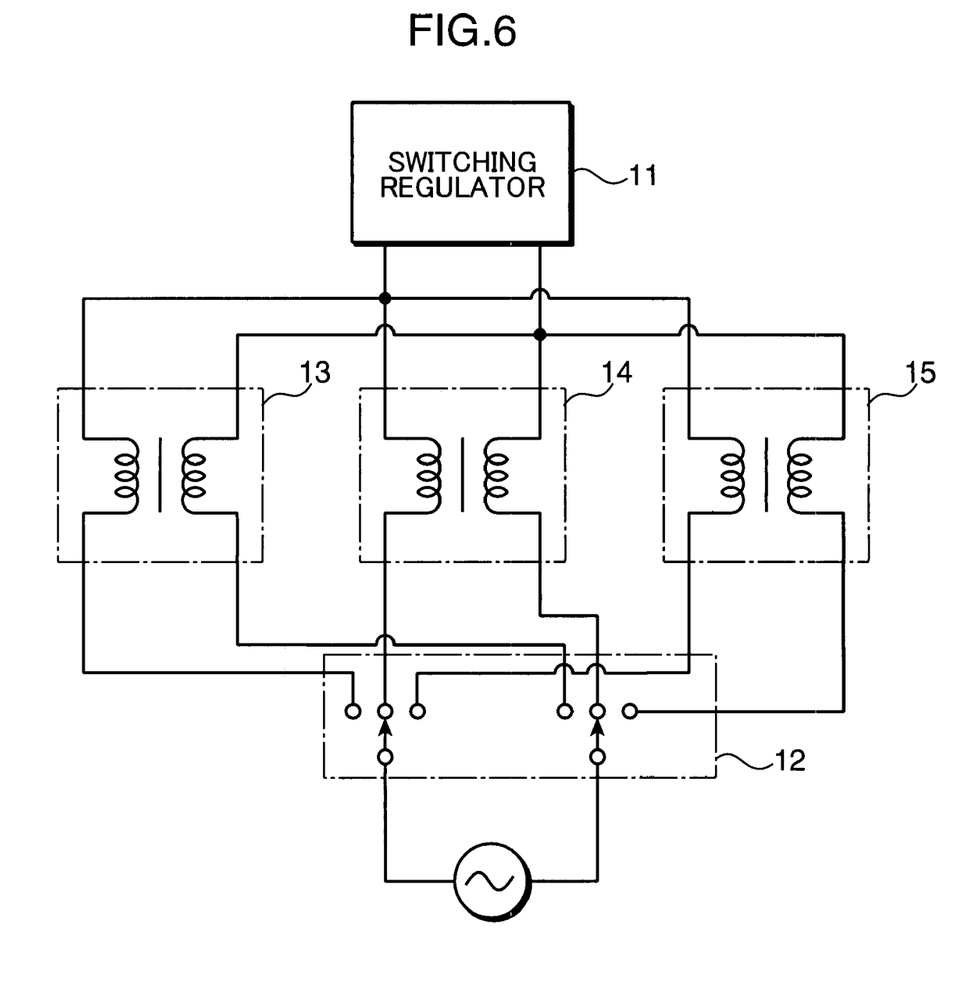
FIG. 6 is a circuit diagram showing another example on the arrangement of the filters and the filter switcher in the embodiment.

Now, an example of the arrangement on the filters 13, 14, and 15, and the filter switcher 12 is described. FIGS. 5 and 6 are circuit diagrams of the filters 13, 14, 15, and the filter switcher 12 which are different from each other in arrangement. Referring to FIGS. 5 and 6, each of the filters 13, 14, and 15 is constituted of two coils respectively connected to two different electric lines derived from a common AC power source. The coils of the filters 13, 14, and 15 have different filtering performances from each other, thereby producing the filters 13, 14 and 15 having the different filtering characteristics as shown in FIGS. 2 and 3.

FIG. 5 is a circuit diagram, in which the filters 13, 14 and 15 are connected in series, and detour circuits including relay switches e.g. switches A, B, and C are provided to flow the current while detouring the filters 13, 14, and 15, respectively. In this circuit configuration, for instance, opening the switch A and closing the switches B and C enables to use the filter 13 exclusively. Likewise, opening the switch B and closing the switches A and C enables to use the filter 14 exclusively. Likewise, opening the switch C and closing the switches A and B enables to use the filter 15 exclusively. In the example shown in FIG. 5, the three different states are made by simultaneously opening or closing the relay switches A, B, or C having the symbols identical to each other. Alternatively, states other than the above three states may be made by combinations of opening/closing of the six relay switches A, B, and C.

FIG. 6 is a circuit diagram, in which the filters 13, 14, and 15 are connected in parallel to each other, and the filter switcher 12 is provided to switch over the filter through which the current is allowed to flow among the filters 13, 14, and 15. A switching operation for the filters 13, 14, and 15 by the filter switcher 12 enables to determine the filter to be used among the filters 13, 14, and 15.

Figure 7:
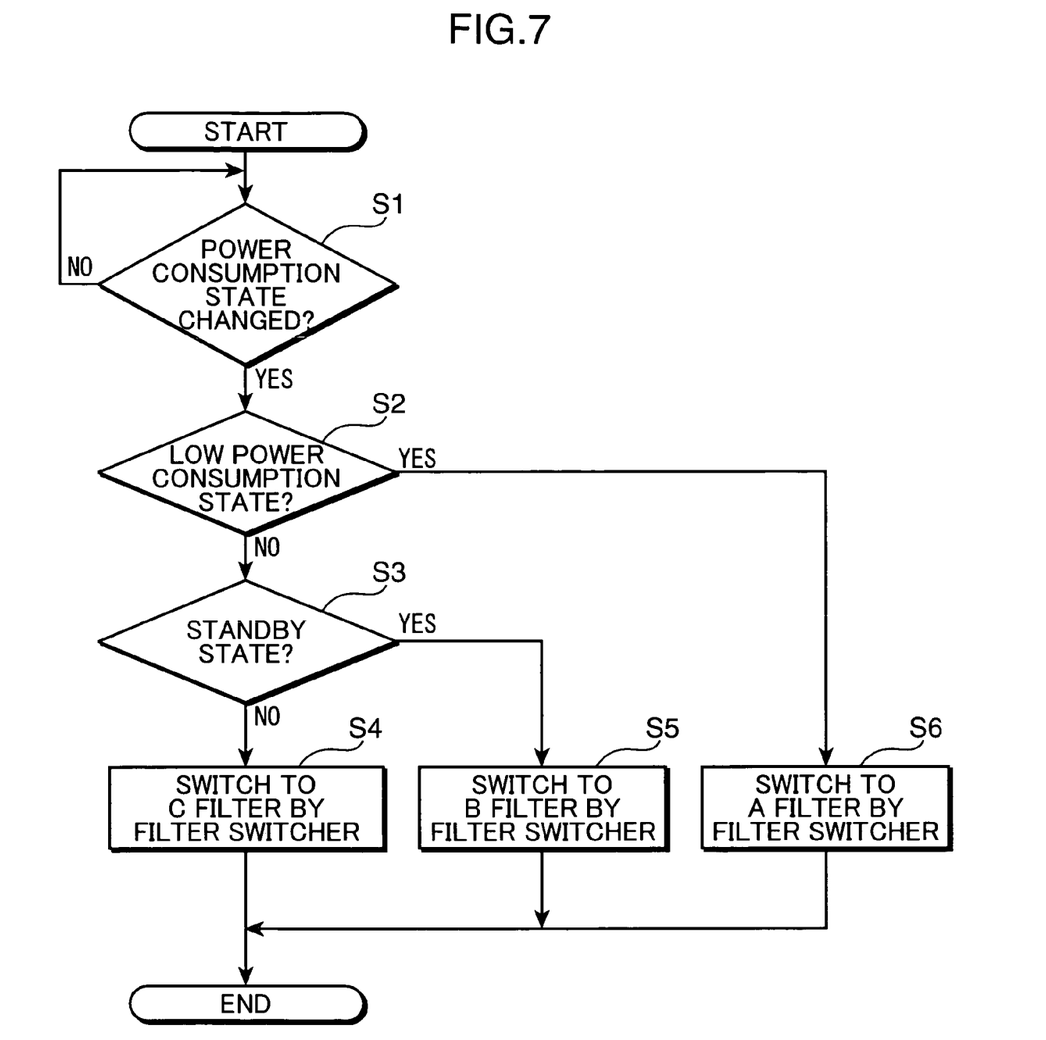
FIG. 7 is a flowchart showing a filter switching control in the embodiment.

Now, a flow on filter switching control in the embodiment is described. FIG. 7 is a flowchart showing the flow on filter switching control in the embodiment.

First, the apparatus power consumption state detector 171 measures the amount of a current flowing in the switching regulator 11, and judges whether the power consumption state of the electrical apparatus 2 connected to the AC adaptor 1 has been changed (Step S1). If the apparatus power consumption state detector 171 does not detect a change of the power consumption state (NO in Step S1), Step S1 is cyclically repeated until the judgment result in Step S1 becomes affirmative. If, on the other hand, the apparatus power consumption state detector 171 detects a change of the power consumption state (YES in Step S1), the apparatus power consumption state detector 171 sends information concerning the newly detected power consumption state to the filter switching controller 172.

Then, the filter switching controller 172 judges whether the newly detected power consumption state is the low power consumption state (Step S2). If it is judged that the newly detected power consumption state is the low power consumption state (YES in Step S2), the filter switching controller 172 reads out, from the state-filter relations storage 173, the type of the filter, in this case, the filter 13 in relation to the detected low power consumption state, and controls the filter switcher 12 to switch over the filter to be used in the electrical apparatus 2 to the filter 13.

If it is judged that the currently detected power consumption state is not the low power consumption state (NO in Step S2), the filter switching controller 172 judges whether the newly detected power consumption state in Step S1 is the standby state (Step S3). If it is judged that the newly detected power consumption state is the standby state (YES in Step S3), the filter switching controller 172 reads out, from the state-filter relations storage 173, the type of the filter, in this case, the filter 14 in relation to the detected standby state, and controls the filter switcher 12 to switch over the filter to be used in the electrical apparatus 2 to the filter 14 (Step S5).

If it is judged that the currently detected power consumption state is not the standby state (NO in Step S3), the filter switching controller 172 reads out, from the state-filter relations storage 173, the type of the filter, in this case, the filter 15 in relation to the detected operated state, and controls the filter switcher 12 to switch over the filter to be used in the electrical apparatus 2 to the filter 15 (Step S4).

In the above embodiment, the filter is selectively switched among the filters 13, 14, and 15 to suppress the conducted noise in association with the currently detected power consumption state of the electrical apparatus 2 connected to the AC adaptor 1. This enables to suppress the conducted noise to the standard limit value or less in the various states of the electrical apparatus, and to suppress the power consumption in filtering the conducted noise.

The invention is not limited to the foregoing, but may be applied to the following modifications. In the embodiment, the invention has been described for the case that the electrical apparatus to which the DC is supplied through the AC adaptor 1 is the image forming apparatus. The electrical apparatus to which the DC is supplied through the AC adaptor 1 may be any electrical apparatus other than the image forming apparatus.

In the embodiment, the three filters having the filtering characteristics different from each other, or a filter whose filtering characteristic is changeable among three different filtering characteristics are used in association with the three different power consumption states of the electrical apparatus i.e. the low power consumption state, the standby state, and the operated state. Alternatively, the number of the type of filter may be arbitrarily set as long as the number corresponds to the number of power consumption states of the electrical apparatus.

Figure 8:
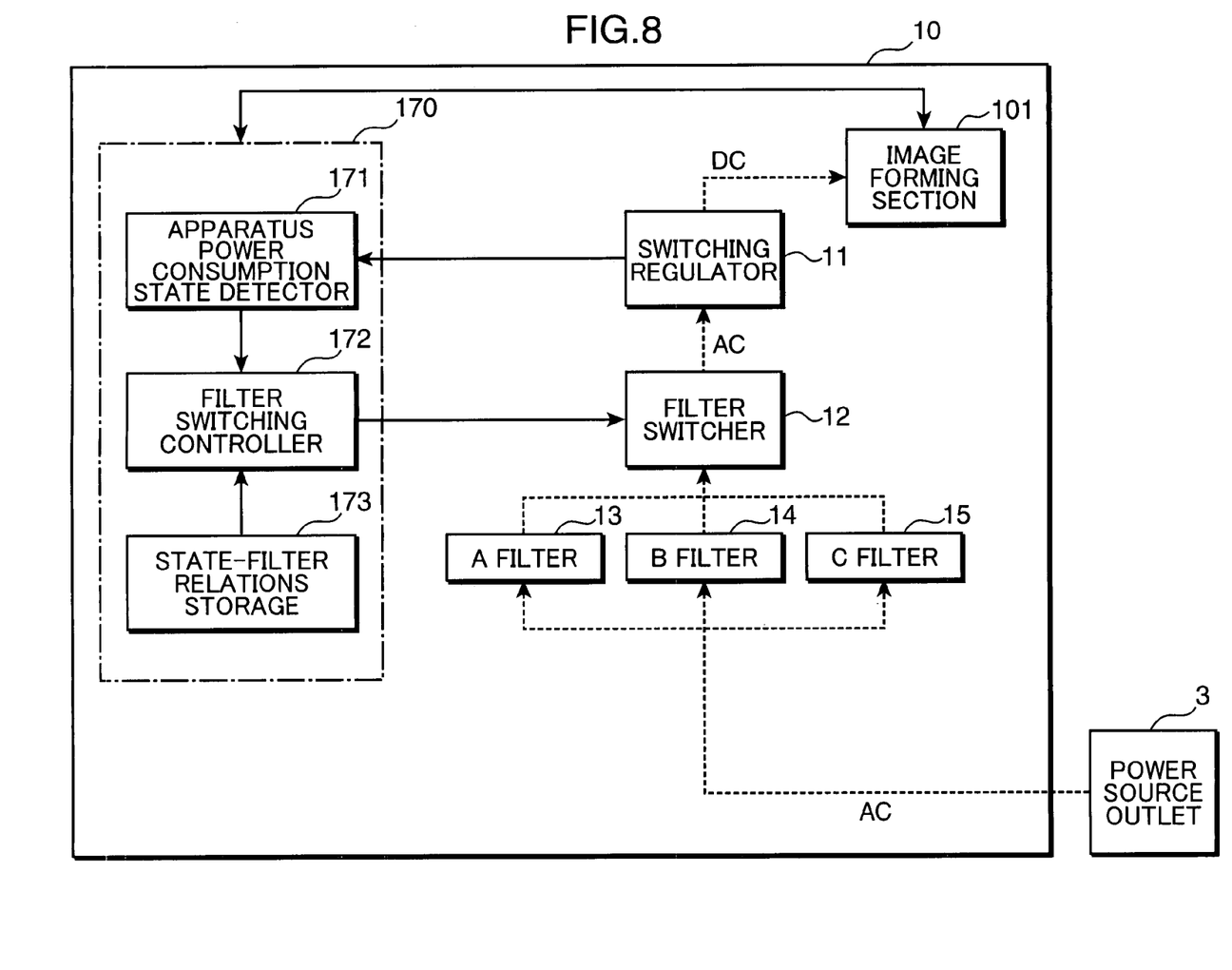
FIG. 8 is an illustration showing a schematic arrangement of an image forming apparatus, which is an example of the electrical apparatus in accordance with the embodiment of the invention.

Also, the invention is not limited to the foregoing, but may be applied to the following modifications. In the embodiment, the invention has been described concerning the AC adaptor 1, which serves as a converting device of the invention, and is adapted to supply the DC to the image forming apparatus, which is an example of the electrical apparatus. Alternatively, the invention is applicable to an electrical apparatus which is provided with a switching regulator, and has a function of converting an AC supplied from a commercial power source to a DC, e.g. an image forming apparatus. The electrical apparatus of the invention, however, is not limited to the image forming apparatus. FIG. 8 is an illustration showing a schematic construction of the image forming apparatus. In FIG. 8, elements which are identical or equivalent to those in FIG. 1 are denoted at the same reference numerals, and description thereof is omitted herein.

Referring to FIG. 8, similarly to the AC adaptor 1, the image forming apparatus 10 includes a switching regulator 11, a filter switcher 12, an A filter 13, a B filter 14, and C filter 15 (called as "filters 13, 14, and 15"). The image forming apparatus 10 is so constructed as to supply a DC from the switching regulator 11 to an image forming section 101 constituted of various mechanisms for forming an image onto a recording sheet. Also, the image forming apparatus 10 includes a control unit 170 provided with an apparatus power consumption state detector 171, a filter switching controller 172, and a state-filter relations storage 173, as in the case of the AC adaptor 1. Alternatively, the control unit 170 provided with the apparatus power consumption state detector 171, the filter switching controller 172, and the state-filter relations storage 173 may be provided in a main controller for controlling overall operations of the image forming apparatus 10. Further alternatively, a control unit for controlling conversion of an alternate current into a direct current may be provided independently of a main controller for controlling overall operations of the image forming apparatus 10.

To summarize the invention, an aspect of the invention is directed to a converting device for converting an alternate current to a direct current. The converting device comprises: a converter, provided with a switching regulator, for converting an alternate current to a direct current; a plurality of filters, provided on an alternate current side of the converter, for filtering a conducted noise generated at the converter, the filters having filtering performances different from each other; a filter switcher for switching the filter to be used in the converting device among the plurality of filters; a detector for detecting one of a plurality of different power consumption states of an electrical apparatus connected to the converting device; a storage for storing correlations between the power consumption states of the electrical apparatus and the filters to determine the filter which meets requirements that the conducted noise to be filtered in the converting device is suppressed to a standard limit value or less, and power consumption is made lowest among the filters; and a filter switching controller for acquiring the power consumption state of the electrical apparatus detected by the detector, and reading out, from the storage, the filter which meets the requirements that the conducted noise to be filtered in the converting device is suppressed to the standard limit value or less and the power consumption is made lowest among the filters to control the filter switcher to switch over the filter to be used in the converting device to the readout filter.

With the above arrangement, the detector detects one of the different power consumption states of the electrical apparatus connected to the converting device. The filter switching controller reads out, from the storage, the type of the filter which meets the requirements that the conducted noise to be filtered in the detected power consumption state of the electrical apparatus is suppressed to the standard limit value or less, and the power consumption is made lowest among the filters. The filter switching controller controls the filter switcher to switch over the filter to be provided on the AC input side of the converter to the readout filter.

Preferably, in the converting device, the filters may have the different filtering performances in correlation to the power consumption states of the electrical apparatus. The storage may store therein the correlations between the power consumption states of the electrical apparatus detected by the detector, and the filters in one-to-one correspondence; and the filter switching controller may acquire the power consumption state of the electrical apparatus detected by the detector, and read out, from the storage, the filter in correlation to the detected power consumption state of the electrical apparatus to control the filter switcher to switch the filter to be used in the converting device to the readout filter.

Another aspect of the invention is directed to an electrical apparatus provided with a function of converting an alternate current to a direct current. The electrical apparatus comprises: a switching regulator for converting an alternate current to a direct current; a plurality of filters, provided on an alternate current side of the switching regulator, for filtering a conducted noise generated at the converter, the filters having filtering performances different from each other; a filter switcher for switching the filter to be used in the electrical apparatus among the plurality of filters; a detector for detecting one of a plurality of different power consumption states of the electrical apparatus; a storage for storing correlations between the power consumption states of the electrical apparatus and the filters to determine the filter which meets requirements that the conducted noise to be filtered in the electrical apparatus is suppressed to a standard limit value or less, and power consumption is made lowest among the filters; and a filter switching controller for acquiring the power consumption state of the electrical apparatus detected by the detector, and reading out, from the storage, the filter which meets the requirements that the conducted noise to be filtered in the electrical apparatus is suppressed to the standard limit value or less and the power consumption is made lowest among the filters to control the filter switcher to switch over the filter to be used in the electrical apparatus to the readout filter.

With the above arrangement, the detector detects one of the different power consumption states of the electrical apparatus. The filter switching controller reads out, from the storage, the type of the filter which meets the requirements that the conducted noise to be filtered in the detected power consumption state of the electrical apparatus is suppressed to the standard limit value or less, and the power consumption is made lowest among the filters. The filter switching controller controls the filter switcher to switch over the filter to be provided on the AC input side of the switching regulator to the readout filter.

Preferably, in the electrical apparatus, the filters may have the different filtering performances in correlation to the power consumption states of the electrical apparatus. The storage may store therein the correlations between the power consumption states of the electrical apparatus detected by the detector, and the filters in one-to-one correspondence; and the filter switching controller may acquire the power consumption state of the electrical apparatus detected by the detector, and read out, from the storage, the filter in correlation to the detected power consumption state of the electrical apparatus to control the filter switcher to switch the filter to be used in the electrical apparatus to the readout filter.

Preferably, the electrical apparatus may further comprise a control unit for controlling overall operations of the electrical apparatus, wherein the control unit functionally includes the storage and the filter switching controller.

Preferably, the electrical apparatus may include an image forming apparatus.

The above arrangements enable to suppress the conducted noise to the standard limit value or less, and to reduce the power consumption in filtering the conducted noise.

This application is based on Japanese Patent Application No. 2005-97664 filed on Mar. 30, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A converting device for converting an alternate current to a direct current, comprising:
    a converter, provided with a switching regulator, for converting an alternate current to a direct current;
    a plurality of filters, provided on an alternate current side of the converter, for filtering a conducted noise generated at the converter, the filters having filtering performances different from each other;
    a filter switcher for switching the filter to be used in the converting device among the plurality of filters;
    a detector for detecting one of a plurality of different power consumption states of an electrical apparatus connected to the converting device;
    a storage for storing correlations between the power consumption states of the electrical apparatus and the filters to determine the filter which meets requirements that the conducted noise to be filtered in the converting device is suppressed to a standard limit value or less, and power consumption is made lowest among the filters; and
    a filter switching controller for acquiring the power consumption state of the electrical apparatus detected by the detector, and reading out, from the storage, the filter which meets the requirements that the conducted noise to be filtered in the converting device is suppressed to the standard limit value or less and the power consumption is made lowest among the filters to control the filter switcher to switch over the filter to be used in the converting device to the readout filter.

2. The converting device according to claim 1, wherein
    the filters have the different filtering performances in correlation to the power consumption states of the electrical apparatus;
    the storage stores therein the correlations between the power consumption states of the electrical apparatus detected by the detector, and the filters in one-to-one correspondence; and
    the filter switching controller acquires the power consumption state of the electrical apparatus detected by the detector, and reads out, from the storage, the filter in correlation to the detected power consumption state of the electrical apparatus to control the filter switcher to switch the filter to be used in the converting device to the readout filter.

3. An electrical apparatus provided with a function of converting an alternate current to a direct current, comprising:
    a switching regulator for converting an alternate current to a direct current;
    a plurality of filters, provided on an alternate current side of the switching regulator, for filtering a conducted noise generated at the converter, the filters having filtering performances different from each other;
    a filter switcher for switching the filter to be used in the electrical apparatus among the plurality of filters;
    a detector for detecting one of a plurality of different power consumption states of the electrical apparatus;
    a storage for storing correlations between the power consumption states of the electrical apparatus and the filters to determine the filter which meets requirements that the conducted noise to be filtered in the electrical apparatus is suppressed to a standard limit value or less, and power consumption is made lowest among the filters; and
    a filter switching controller for acquiring the power consumption state of the electrical apparatus detected by the detector, and reading out, from the storage, the filter which meets the requirements that the conducted noise to be filtered in the electrical apparatus is suppressed to the standard limit value or less and the power consumption is made lowest among the filters to control the filter switcher to switch over the filter to be used in the electrical apparatus to the readout filter.

4. The electrical apparatus according to claim 3, wherein
    the filters have the different filtering performances in correlation to the power consumption states of the electrical apparatus;
    the storage stores therein the correlations between the power consumption states of the electrical apparatus detected by the detector, and the filters in one-to-one correspondence; and
    the filter switching controller acquires the power consumption state of the electrical apparatus detected by the detector, and reads out, from the storage, the filter in correlation to the detected power consumption state of the electrical apparatus to control the filter switcher to switch the filter to be used in the electrical apparatus to the readout filter.

5. The electrical apparatus according to claim 3, further comprising:
    a control unit for controlling overall operations of the electrical apparatus, wherein
    the control unit functionally includes the storage and the filter switching controller.

6. The electrical apparatus according to claim 4, further comprising:

a control unit for controlling overall operations of the electrical apparatus, wherein the control unit functionally includes the storage and the filter switching controller.

7. The electrical apparatus according to claim 3, wherein the electrical apparatus includes an image forming apparatus.

8. The electrical apparatus according to claim 4, wherein the electrical apparatus includes an image forming apparatus.

9. The electrical apparatus according to claim 5, wherein the electrical apparatus includes an image forming apparatus.

10. The electrical apparatus according to claim 6, wherein the electrical apparatus includes an image forming apparatus.

* * * * *